US012202162B2

(12) United States Patent
Fevre et al.

(10) Patent No.: US 12,202,162 B2
(45) Date of Patent: Jan. 21, 2025

(54) MOTORISED FOOD-PROCESSOR APPARATUS

(71) Applicant: HAMEUR, Luxembourg (LU)

(72) Inventors: Loïc Fevre, Luxembourg (LU); Pierre Dumas, Luxembourg (LU)

( * ) Notice: Subject to any disclaimer, the term of this patent is extended or adjusted under 35 U.S.C. 154(b) by 0 days.

(21) Appl. No.: 17/309,810

(22) PCT Filed: Dec. 20, 2019

(86) PCT No.: PCT/EP2019/086641
§ 371 (c)(1),
(2) Date: Jun. 21, 2021

(87) PCT Pub. No.: WO2020/127948
PCT Pub. Date: Jun. 25, 2020

(65) Prior Publication Data

US 2022/0072727 A1 Mar. 10, 2022

(30) Foreign Application Priority Data

Dec. 21, 2018 (FR) ...................................... 1873885

(51) Int. Cl.
*B26D 1/29* (2006.01)
*B26D 1/00* (2006.01)
*B26D 3/22* (2006.01)

(52) U.S. Cl.
CPC ............. *B26D 1/29* (2013.01); *B26D 1/0006* (2013.01); *B26D 3/22* (2013.01); *B26D 2001/0053* (2013.01); *B26D 2210/02* (2013.01)

(58) Field of Classification Search
CPC .................... B26D 1/0006; B26D 1/29; B26D 2001/0053; B26D 2003/288;
(Continued)

(56) References Cited

U.S. PATENT DOCUMENTS

| | | | | |
|---|---|---|---|---|
| 118,720 A * | 9/1871 | Heberling | ............. | A47J 43/255 241/296 |
| 712,753 A * | 11/1902 | Bailey | .................... | B26D 1/553 83/468.93 |

(Continued)

FOREIGN PATENT DOCUMENTS

| | | | |
|---|---|---|---|
| BE | 680437 A | 10/1966 |
| CH | 430970 A | 2/1967 |

(Continued)

OTHER PUBLICATIONS

The Advantages of Serrated Edges, Nov. 13, 2017, avaiable at: https://www.thetruthaboutguns.com/advantages-serrated-edges/, on Oct. 18, 2022 (Year: 2017).*

(Continued)

*Primary Examiner* — Jonathan G Riley
(74) *Attorney, Agent, or Firm* — Patshegen IP; Moshe Pinchas

(57) ABSTRACT

A motorized food-processor apparatus (100) which comprises:
- a housing (101) containing a drive motor (102) for rotating a shaft (103) about an axis of rotation (115),
- at least one cutter (104) rotated by the motor,
- a guide plate (109), comprising at least one guide ridge (111),
- an outlet tool (112) located in the path of the foodstuff towards an outlet opening, and
- at least one drive unit (114) for driving through the outlet tool.

The outlet tool comprises a series of blades (113) in which, for any pair of adjacent blades, the portions of these two adjacent blades do not have any intersection of their orthogonal projections on a plane that is
(Continued)

parallel to the axis of rotation (115) and
parallel to the segment formed by the intersection of one of these two blades with a plane perpendicular to the axis of rotation.

14 Claims, 6 Drawing Sheets

(58) Field of Classification Search
CPC ........ B26D 2210/02; B26D 3/18; B26D 3/22; B26D 2003/286; B26D 3/283; A47J 43/046; Y10T 83/21; Y10T 83/768; Y10T 83/6588; Y10T 83/9498
See application file for complete search history.

(56) References Cited

U.S. PATENT DOCUMENTS

| | | | | | |
|---|---|---|---|---|---|
| 1,955,360 | A * | 4/1934 | Ferry | B26D 3/225 83/717 | |
| 3,139,128 | A * | 6/1964 | Urschel | B26D 1/0006 83/168 | |
| 3,392,768 | A * | 7/1968 | Anliker | B26D 3/22 83/113 | |
| 3,703,918 | A * | 11/1972 | Borner | B26D 3/283 83/858 | |
| 3,799,023 | A * | 3/1974 | Brignard | B02C 18/08 83/591 | |
| 4,560,111 | A * | 12/1985 | Cavalli | A47J 43/0722 241/286 | |
| 10,470,613 | B2 * | 11/2019 | Obersteiner | B26D 3/26 | |
| 2010/0146795 | A1 * | 6/2010 | Houle | B26D 3/169 30/92 | |
| 2015/0158194 | A1 * | 6/2015 | Krauss | B26D 1/0006 83/13 | |

FOREIGN PATENT DOCUMENTS

| | | | |
|---|---|---|---|
| CN | 105904491 | A * | 8/2016 |
| EP | 0570153 | A1 * | 11/1992 |
| FR | 2109211 | A5 | 5/1972 |
| FR | 2859900 | A1 | 3/2005 |

OTHER PUBLICATIONS

ISR: European Patent Office; Feb. 20, 2020.

* cited by examiner

MOTORISED FOOD-PROCESSOR APPARATUS

TECHNICAL FIELD

The present invention concerns a motorized food-processor apparatus. It applies particularly to the field of vegetable slicers. More specifically, the invention applies to cutting fruit and vegetables to form sticks, shoestrings or fries, and specially to cutting potatoes into fries prior to cooking them.

PRIOR STATE OF THE ART

There are several different solutions in the technical field of the invention, which relates to the principle consisting of cutting a slice of the vegetable using a cutter carried by a rotating disc, which slice is moved in this cutting motion from one side of the disc, generally the upper one, toward the opposite side, where suitably-shaped forms push it in a substantially perpendicular direction to the axis of rotation of the disc, against a grille made of a series of fixed blades, so as to be split into sticks. The first transverse dimension of a stick is determined by the thickness of the slice and the second dimension by the distance between the two fixed blades that formed it. In this method, the length of the fixed blades is substantially equal to the thickness of the vegetable's slice. In particular, this method is utilized in patents CH430970A and BE680437A.

Current disc/grille assemblies used in food processing appliances to cut vegetables according to this principle limit the cross-section of the sticks to a square with sides of at least eight millimeters. A slice having a desired thickness equal to or greater than eight millimeters is brought upstream of the cutting grille. When the slice comes into contact with the series of parallel blades carried by the grille and separated from each other by a distance whose value is substantially equal to the thickness of the slice, said slice is sliced again into sticks with a square cross-section.

This type of apparatus is more frequently used for cutting potatoes into fries. In this case, the potato slice's intrinsic rigidity, measured by Young's modulus for example, prevents fries with a smaller cross-section being made. This is because, when the slice is being sliced again by the blades of the grille, each portion of potato located between two adjacent blades is subjected, due to the thickness of the blade, to a lateral compression inversely proportional to the ratio of the thickness of the blade over the distance between these two adjacent blades. Consequently, the closer two adjacent blades of the grille are to each other in order to make sticks with smaller cross-sections, the higher the compression ratio is and therefore the greater the force needed to make this portion of potato pass between the blades is.

This phenomenon is made worse by the intrinsic cutting force when the slice is cut again, which must increase with the number of blades, i.e. attempting to produce sticks with a smaller cross section, as well as with the unavoidable gradual wear of the blades' cutting edge. The intrinsic cutting force directly increases the compression force. Consequently, the resistance to cutting the slice is substantially inversely proportional to the cross-section of the sticks.

Furthermore, when the required cross-section of the fries is small, the slice has to be cut in a smaller thickness, e.g. less than eight millimeters, which consequently provides lower resistance to warping when it is pressed up against the blades of the grille. However, resistance to warping is proportional to the square of the thickness.

Therefore, with these devices, the combination of all or part of these effects, which is substantially proportional to the cube of the cross section of the sticks, makes it impossible to cut fries with a small cross section since the potato slices' own resistance is incompatible with the forces they are subjected to. The disc pushing the successive slices makes them curve and break when in contact with the blades of the grille. In these conditions, this leads to them being crushed into multiple broken pieces of random shapes and sizes.

It is especially difficult to produce fries with a six-millimeter square cross-section, as the slices are much more likely to break than eight-millimeter-thick slices.

There are similar devices for cutting potatoes into fries using a cutter carried by a rotating disc that forms a slice of the vegetable to be processed. This slice moves from a generally upper side of the disc toward the opposite side where a ramp presses it in a direction parallel to the axis of rotation up against a series of fixed blades parallel to each other and located under the opposite side of the disc, where they are split into sticks. Document FR 2109211 discloses such a device. The distance between the blades matches one dimension of the desired cross-section of the fries. However, with this device, the length of the fixed blades must be sufficient to cover the entire surface of the disc. The blades' length is very large in comparison with the lateral dimensions of the sticks. The fixed blades are deformed by the cutting forces they are subjected to; consequently they do not remain parallel with each other, causing sticks of very irregular and random shapes to be cut.

There are other devices, generally only for use with potatoes, which utilize a rotating drive drum and at least one set of fixed blades held at its periphery. The potatoes are transported whole to the center of the rotating drum, which comprises spiraling internal surfaces. These spiraling internal surfaces, with the combined action of centrifugal force, push the potatoes toward the peripheral surface where openings made in the drum's lateral wall allow the potato to protrude by a distance set by the distance to the housing that contains the drum.

The potato is subjected to the drum's rotating motion by the action of the spiral shapes, and its trajectory comes up against all the fixed blades, arrange in the shape of a comb, to be cut into sticks. The "comb" is located on tangential plane to the drum's peripheral surface. Patent GB844988 utilizes this principle.

These devices require complex means to transport the potatoes to the drum's center. In addition, perfectly rectilinear sticks cannot be produced by the cutting method, specifically because of the tangential cut effect.

Lastly, an apparatus utilizing this device does not provide the broad diversity of cuts available from a device utilizing a disc, as the drum only has a pushing function. Consequently, cutting vegetables into cubes, for example, cannot be envisaged with such an apparatus, which is a significant drawback. There are also devices that do not cut the potato into slices beforehand but instead split it into sticks in a single operation. These devices utilize a grille made of blades arranged in two perpendicular directions, whose cutting edges form squares. The entire length of the potato is pushed through the grille. This method is often reserved for manual French fry cutters because it is more difficult to mechanize, due to the cutting motion that must be exerted on a long rectilinear trajectory, which cannot be achieved simply when utilizing a rotary motor.

DESCRIPTION OF THE INVENTION

The present invention aims to remedy all or part of these drawbacks. To this end, the present invention envisages a motorized food-processor apparatus comprising:

- a housing containing a drive motor for rotating a shaft about an axis of rotation;
- at least one cutter set into rotation around the axis by the motor, said cutter comprising a cutting edge extending from the shaft toward the outside of the housing;
- a cover connected to the housing and surrounding the trajectory of the cutter, the cover being fitted with a feeding conduit for bringing the foodstuff to be cut into said trajectory;
- an outlet opening for the cut foodstuff;
- a guide plate for guiding the cut foodstuff to the outlet opening;
- at least one guide ridge on the plate that defined the trajectory of the cut foodstuff toward the outlet tool;
- an outlet tool located in the path of the food towards the outlet opening;
- at least one drive unit subjected to the same rotation about the axis as the cutter, following a trajectory located on the side of the cutter's trajectory opposite the inlet conduit, for driving the cut foodstuff between the guide plate and the cutter's trajectory toward the outlet tool;

wherein the outlet tool comprises a series of blades where, for any pair of adjacent blades, the portions of these two adjacent blades located on the trajectory of the cut foodstuff do not have any intersection of their orthogonal projections on a plane that is

- parallel to the axis of rotation and
- parallel to the segment formed by the intersection of one of these two blades with a plane perpendicular to the axis of rotation.

Note that, for one blade in a vertical plane such as the axis of rotation, the orthogonal projection plane is the plane of the blade. In this case, according to the invention, the orthogonal projection of the usable portion of a vertical blade on the vertical plane of an adjacent blade is entirely outside the usable portion of this adjacent blade:

The portion located on the trajectory of the slice of foodstuff ("usable portion") of one of these blades on the other's general plane does not comprise any point on the portion of this other blade located on the trajectory of the slice of foodstuff.

Because of these arrangements, two adjacent blades in the series of blades do not pinch and do not crush laterally the same portion of the foodstuff during its movement. Once the foodstuff starts to be split by the cutting edge of a first adjacent blade, the portion thus formed moves laterally by one half blade thickness with no stress since no second adjacent blade is located in front of the first one. Similarly, as it continues its movement, the portion of the foodstuff moves laterally in the other direction by on half blade thickness with no stress, when it is being divided by the cutting edge of a second adjacent blade, since there is no other adjacent blade in front of it that could compress the foodstuff (see FIG. 16).

In this way, each portion of the foodstuff follows a kind of chicane during its movement toward the exit from the apparatus, being kept away by one-half blade width firstly on one side by a first of two adjacent blades, then on the other side by the second, without the foodstuff being at any place along its path compressed between two adjacent blades facing each other. In this way, the compression force is eliminated in relation to the arrangement of adjacent blades facing each other on either side of the path of each portion of the foodstuff, because the blades do not act simultaneously on the foodstuff at a single point of its trajectory.

The invention makes it possible to produce straight sticks, i.e. whose overall shape is parallelepiped rectangles with a small cross-section, for example a square six millimeters by six millimeters for potatoes, in line with consumer demand.

Because the compression force is thus eliminated, foodstuff can be cut into thinner slices, and simultaneously two adjacent blades of the outlet tool can also be arranged at a smaller apparent distance between each other, perpendicular to the foodstuff's trajectory without the foodstuff curving or breaking despite its lower resistance due to its smaller thickness.

In some embodiments, the blades have cutting edges whose mean slope forms an angle of less than 70° to a plane perpendicular to the axis of rotation.

Having a blade with its cutting edge in a position substantially parallel to the axis of rotation, the blade's cutting edge perforates the slice over its entire height at the same moment. When the cutting edges of the blades form an angle sufficiently smaller than a right angle in relation to a plane perpendicular to the axis of rotation, the perforation into the slice is gradual with an initiation at the start, and in turn the cutting forces are greatly reduced. This arrangement contributes further to keeping down the forces that the foodstuff slice is subjected when it is being divided, thus making it possible to cut foodstuffs with low resistance into sticks with a small cross-section.

In some embodiments, the blades have cutting edges made of a succession of concave arcs. These embodiments make it possible to give the cutting edges a succession of serrations formed by the intersections of successive concave arcs. The presence of these spikes is either an alternative or an additional arrangement to the inclination of the blades described above, which facilitates cutting the foodstuff by reducing the force required to the initiation of the cut via the surface perforation effect of the serrations. The reduced cutting force achieved in this way reduces the forces to which the foodstuff slice is subjected, thus contributing to the objective of being able to cut a foodstuff with low resistance, especially potatoes, into sticks with a small cross-section.

In some embodiments, at least one guide ridge on the plate has an increasing elevation in the direction of the trajectory of the foodstuff to be cut, above the foodstuff bearing surface on the guide plate. The guide ridge on the plate is required to bring the slice of foodstuff in the direction of the outlet tool located in the periphery of the cutter's trajectory. To achieve this, the guide ridge works, thus exerting forces on the slice of foodstuff subjected to the drive unit's action of pushing in rotation, to let it deviate from its trajectory in the direction of the outlet tool.

The arrangements that provide the guide ridge's increasing elevation in the direction of the trajectory of the foodstuff to be cut, above the surface of the guide plate, also contribute to reducing the forces to which the foodstuff is subjected as the groove created in the foodstuff during its movement around the guide ridge is formed gradually after an initiation at the start.

In some embodiments, at least one guide ridge on the plate has a cutting portion in at least its upstream portion in the direction of the trajectory of the foodstuff to be cut. These embodiments contribute to the objective of obtaining sticks with small cross-sections, as they make it possible to reduce the forces to which the slice of foodstuff is subjected at the location of the initiation of the groove created in the foodstuff by the guide ridge and oblige it to follow its trajectory in the direction of the tool.

In some embodiments, the thickness of the blades is smaller than or equal to 0.3 mm. In this way, the cutting forces to which the foodstuff is subjected when being cut by blades are kept to a minimum. The risk of breaking the foodstuff is therefore lower.

In some embodiments, the minimum distance between two adjacent blades, measured in a plane perpendicular to the axis of rotation and along a direction perpendicular to the trajectory of the foodstuff in the vicinity of these two blades is smaller than or equal to 8 mm. These embodiments make it possible to make smaller sticks than current devices, for the same foodstuffs.

In some embodiments, the distance between the cutter and the guide plate is smaller than or equal to 8 mm. These embodiments make it possible to make smaller sticks than current devices, for the same foodstuffs.

In this way, it is possible to give to the space for guiding the foodstuff toward the outlet tool, formed between the trajectory of the cutter on the side opposite the supply conduit, which is also the lower surface of the disc, and the guide plate, a dimension perfectly adjusted to the thickness of the slice of foodstuff, thus eliminating any excess space in which the foodstuff could bend and break due to the effect of the forces it is subject to. The slice's resistance to compression is greatly increased by the contention effect applied to it in this way; thus it is possible to transport slices that are less thick towards the outlet tool and cut them, despite their lower resistance, as there perfectly contained within their thickness. This makes it possible to make smaller sticks than current devices, for the same foodstuffs.

In some embodiments, the outlet tool is connected mechanically to the guide plate in a removable manner. In this way, the outlet tool can easily be cleaned or swapped for another outlet tool.

In some embodiments, the apparatus that is the subject of the invention comprises at least two outlet tools, the spacing between the blades of one of the outlet tools being different from the spacing between the blades of another outlet tool. These embodiments allow a user to change the size and/or aspect of the sticks on exit from the apparatus. In some embodiments, the cutter is immobilized in translation by the guide plate along the direction defined by the axis of rotation.

BRIEF DESCRIPTION OF THE DRAWINGS

Other particular advantages, aims and features of the invention will become apparent from the non-limiting description that follows of at least one particular embodiment of the apparatus and the outlet tool that are the subjects of the invention, with reference to drawings included in an appendix, wherein.

DETAILED DESCRIPTION

The present description is given in a non-limiting way, in which each characteristic of an embodiment can be combined with any other characteristic of any other embodiment in an advantageous way.

In the entire description, a vertical axis of rotation has been represented, thus defining the terms "above", "below", "upper" and "lower". Notwithstanding this, the invention is not limited to appliances whose axis of rotation is vertical; it extends to any apparatus with an oblique or horizontal axis of rotation, for which simply rotating the figures will provide the equivalence for the terms mentioned above. In this way, in relation to the support disc for supporting the cutter, "above" means "on the side of the supply conduit for introducing the foodstuffs" and "below" means the opposite side.

Throughout the description, an apparatus comprising a single cutter for cutting slices of foodstuff. Notwithstanding this, the invention extends to embodiments where several cutters are used to form slices of foodstuff, for example two, three or four cutters arranged on a single support disc.

Throughout the description, "adjacent" refers to two blades that cut two opposite faces of a single stick. An "outlet passage" is a passage towards the outlet between two adjacent blades.

Throughout the application, "in front of", as applied to two blades, especially two adjacent blades, means that the orthogonal projection of one of these blades onto the general plane of the other of these blades includes at least one point on this other blade, which point is therefore a lateral pinching of the stick between these two adjacent blades.

Figure 11:
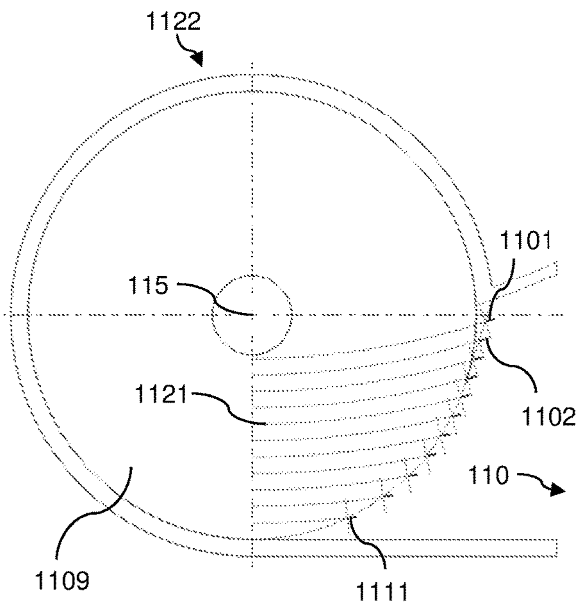
Figure 12:
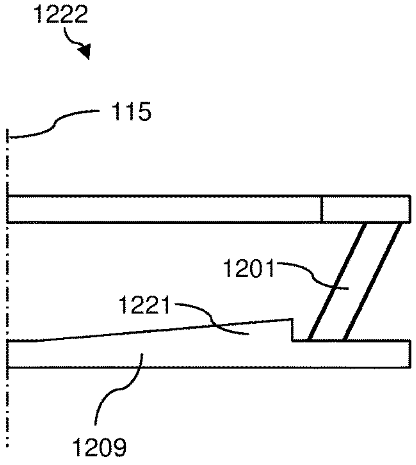
FIGS. 12 and 13 represent, schematically and in a side view, two particular embodiments of foodstuff slice guidance, blade inclination, and shape of a blade's cutting edge.
Figure 13:
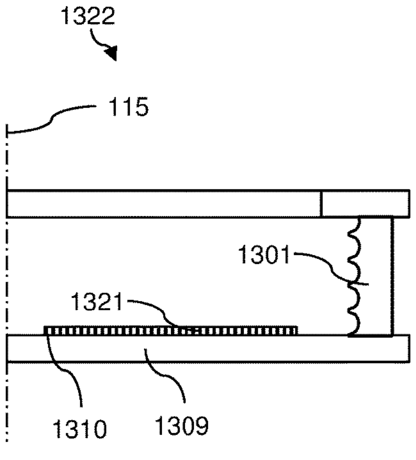

Note that FIGS. 12 and 13 are not to scale, while FIGS. 1 to 11, 14 and 15 are to scale.

Figure 16:
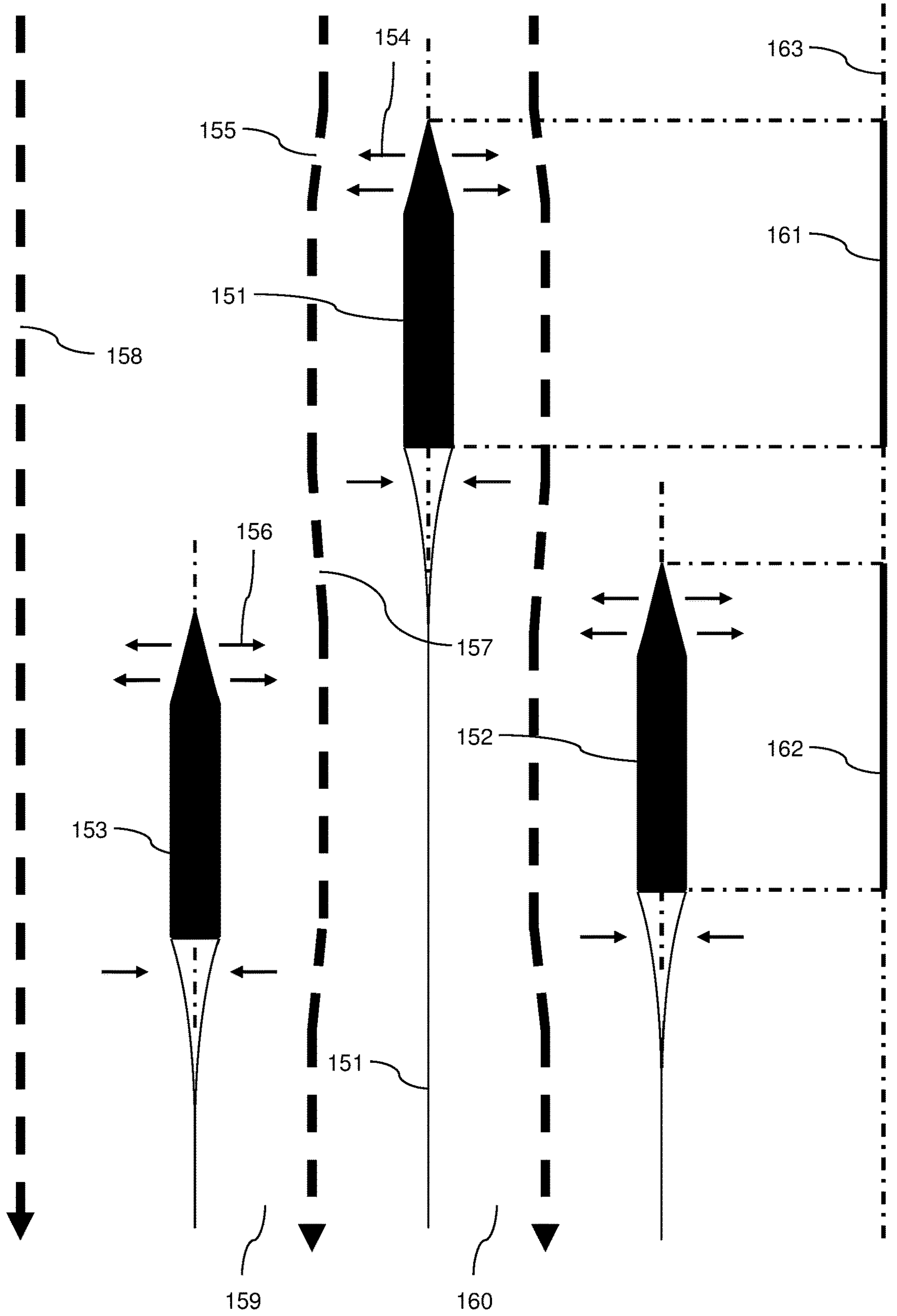
FIG. 16 represents the path of a slice of foodstuff cut by adjacent blades.

FIG. 16 shows two adjacent blades 151 and 152, and a blade 153 adjacent to blade 151. The blades are shown in black. The direction of movement of the foodstuff to be cut into sticks is represented by the dashed arrow 158. Along this direction of movement, the blade 151 is upstream of blades 152 and 153. Once the foodstuff starts being split by the cutting edge of the blade 151, its wall moves along per the arrow 154, by one half thickness of the blade 151, with low stresses since neither of the blades 152 and 153 adjacent to blade 151 is located opposite blade 151. Similarly, as its movement continues, by going past blade 151, under the effect of its elasticity, then, when the foodstuff begins to be cut by the cutting edge of a blade 152 or 153, this portion of the foodstuff moves laterally in the other direction by one half thickness of the blade 151 (arrow 156) with low stress since this portion of the foodstuff has gone past the blade 151.

In this way, each portion of the foodstuff follows a chicane-type trajectory 155 and 157 during its movement toward the exit from the apparatus, being kept away by one-half blade's width firstly on one side by a first of two adjacent blades, then on the other side by the second of these two adjacent blades, without the foodstuff being at any place along its path compressed between two adjacent blades facing each other.

In this way, the compression force is greatly reduced in relation to the arrangement of adjacent blades facing each other on either side of the path of each portion of the foodstuff, because the blades do not act simultaneously on the foodstuff at a single point of its trajectory.

Preferably, the height of the blades' usable portions is greater than the distance between the support disc 116 and the guide plate 109 (see below) so no compression is exerted parallel to the edge of the blades.

The sticks 159 and 160 are produced in this way.

On the right-hand side of FIG. 16, a plane 163 is represented, which is simultaneously

- parallel to the axis of rotation (here, perpendicular to FIG. 16) and
- parallel to the segment formed by the intersection of one of these two blades with a plane perpendicular to the axis of rotation (the plane of FIG. 16).

It can be seen that the orthogonal projections 161 and 162 of the usable portions (located on the trajectory of the slice of foodstuff) of the blades 151 and 152 have no common point, enabling this chicane path, with no pinching between two adjacent blades.

Figure 1:
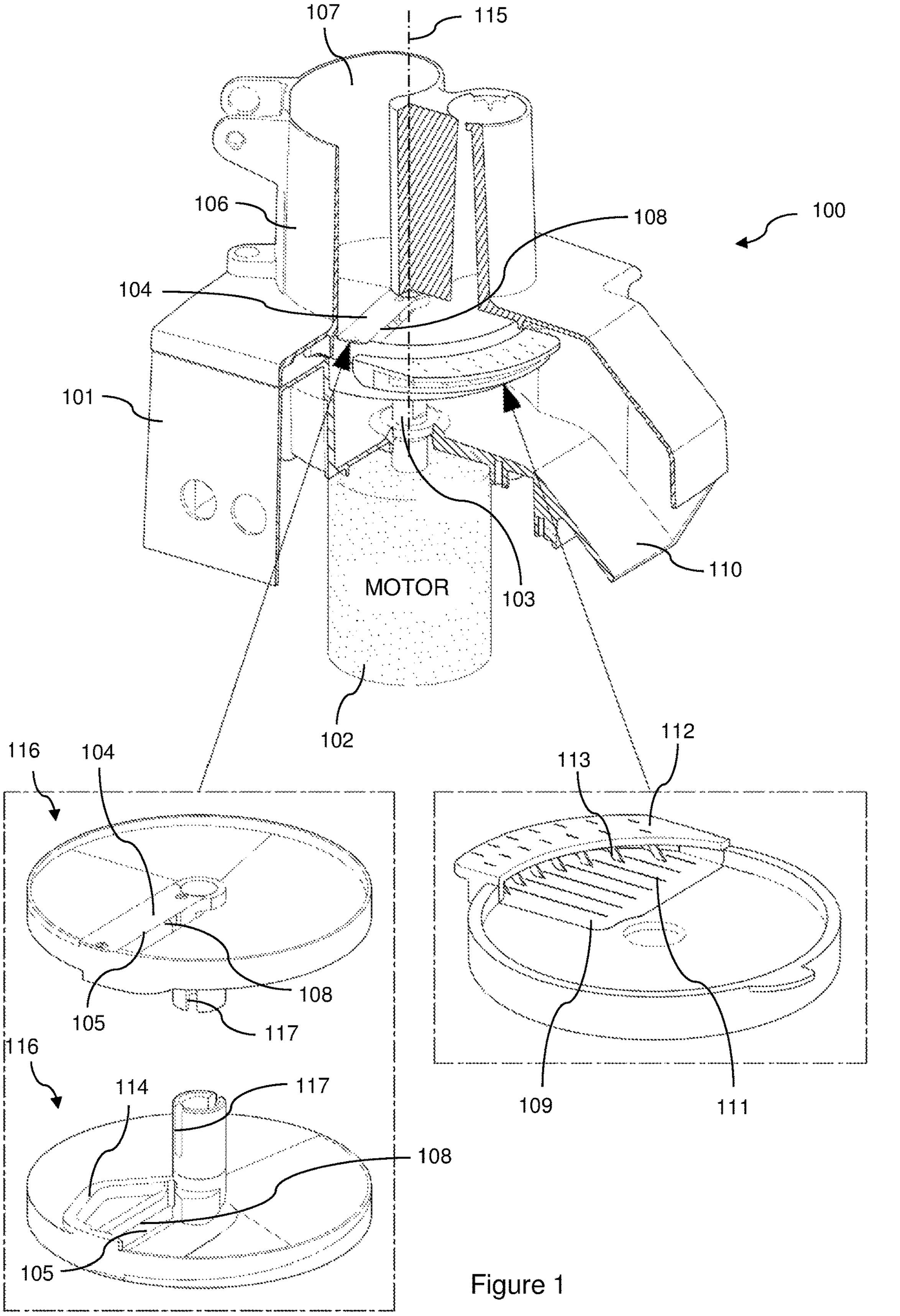
FIG. 1 represents, schematically and in a partial cross section, a first particular embodiment of the apparatus that is the subject of the invention and in a perspective view, two elements of this apparatus.
Figure 15:
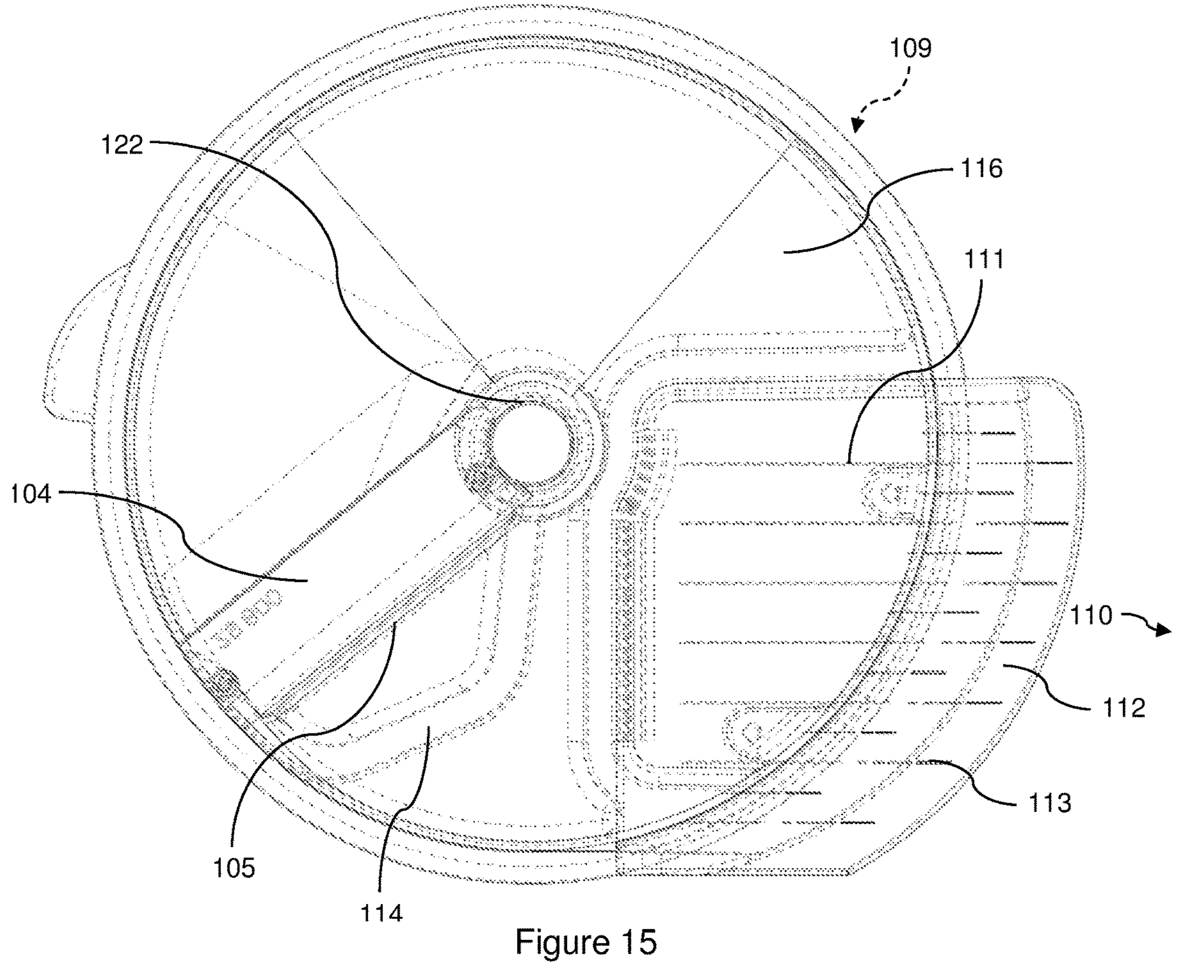
FIG. 15 represents, in a top view, a support disc overhanging a guide plate of the first embodiment of the apparatus that is the subject of the invention.

FIGS. 1 and 15 show an embodiment of the apparatus 100 that is the subject of the invention.

The apparatus 100 for processing food, also called "foodstuffs", comprises:

- a housing 101 containing a drive motor 102 for rotating a shaft 103 about an axis of rotation 115;
- at least one cutter 104 set into rotation around the axis 115 by the motor 102, said cutter comprising a cutting edge 105 extending from the shaft 103 toward the outside of the housing;
- a cover 106 connected to the housing 101 and surrounding the trajectory of the cutter 104, the cover 106 being fitted with a supply conduit 107 for bringing the foodstuff to be cut into said trajectory;
- an outlet opening 110 for the cut foodstuff;
- a guide plate 109 for guiding the cut foodstuff to the outlet opening 110;
- at least one guide ridge 111 on the plate 109 that defines the trajectory of the cut foodstuff toward the outlet tool 112;
- the outlet tool 112 located in the path of the foodstuff toward the outlet opening 110, and
- at least one drive unit 114 subjected to the same rotation about the axis 115 as the cutter 104, following a trajectory located on the side of the trajectory of the cutter 104 opposite the inlet conduit 107, for driving the cut foodstuff between the guide plate 109 and the trajectory of the cutter 104 toward the outlet tool 112.

The outlet tool 112 comprises a series of blades 113 where, for any pair of adjacent blades 113, the portions of these two adjacent blades 113 located on the trajectory of the cut foodstuff do not have any intersection of their orthogonal projections on a plane that is

- parallel to the axis of rotation 115 and
- parallel to the segment formed by the intersection of one of these two blades with a plane perpendicular to the axis of rotation.

The housing 101 of the processing apparatus may be of any shape known to the person skilled in the art. The housing 101 is, for example, a frustum of a cylinder with a circular or parallelepipedal generatrix. Reminder: a frustum of a cylinder is a frustum of a ruled surface defined by a guide curve and a straight line generatrix traveling along this curve.

Preferably, the housing 101 comprises an interior opening in which the plate 109 and the outlet tool 112 are located, said housing's dimensions matching the dimensions of the plate 109 and the outlet tool 112. For example, the inner opening has the shape of a frustum of a cylinder with a circular guide curve.

The apparatus 100 has a cover 106 connected to the housing 101. For example, the cover 106 has a shoulder, whose dimensions match the dimensions of the housing 101, said shoulder surrounding a part of the housing 101 opposite the interior opening. The shoulder may comprise locking means between the cover 106 and the housing 101. For example, the locking means may comprise at least one lug fitting into a corresponding opening on the housing 101. In some embodiments, the locking means enable the operation of the drive motor 102. In this way, when the locking means are not engaged, the drive motor 102 cannot be turned on, preventing the risk of injury to the operator, such as a cut from the cutter 104. The deactivation means may be a push-button activated by at least one lug of the locking means when locking. The cover 106 is fitted with a supply conduit 107 for bringing the foodstuff to be cut into said trajectory.

In some embodiments, the apparatus 100 comprises a pusher rod (not shown) with a shape matching the shape of the supply conduit 107. This pusher rod makes it possible to push the foodstuff to be cut into the trajectory of the cutter 104, without injuring oneself.

Preferably, the supply conduit 107 is a frustum of a cylinder with a bean-shaped guide curve, with an orthogonal projection inscribed into the surface defined by the trajectory of the cutter, and with a straight guide line parallel to the axis of rotation 115. In some embodiments, the cutter 104 is mounted on a support disc having substantially the shape of a disc with a radius slightly greater than the largest dimension of the supply conduit 107 as measured from the axis of rotation 115 and a plane perpendicular to it. Note that the support disc 116 and the guide plate 109 may not be plane but rather conical or toroidal, for example.

In some embodiments, the cutting edge 105 of the cutter 104 is continuous and its extremities as seen from a plane perpendicular to the axis of rotation 115, are located outside the orthogonal projection of the guide curve of the cylinder frustum that forms the supply conduit 107.

In some embodiments, the bean-shaped guide curve at the base of the cylinder frustum constituting the supply conduit 107 is developed to substantially cover three quarters of the surface swept by the cutter 104. This arrangement makes it possible to give the supply conduit 107 a larger usable loading volume for foodstuff to be cut.

In other forms of embodiment, the opening of the supply conduit 107 is built on the base of a cylinder frustum with a circular guide curve; the conduit 107 then surrounds the axis of rotation 115, thus exposing the load of foodstuff to be cut in the supply conduit over a surface of the disc greater than the surface defined by the trajectory of the cutter 104, especially in an area central in relation to the drive shaft where the cutter 104 cannot have any cutting effect on the foodstuff. Preferably, at least one partition (not shown) connected in a removable manner or not to the supply conduit bears surfaces that fill a central volume, preventing the foodstuff from being pushed onto the central area, where the cutter 104 is not active. The partition is substantially in alignment with the surface of the outlet tool 112 farthest downstream in relation to the direction of rotation of the cutter 104. With this arrangement, a slice of foodstuff cut by the cutter 104 is located in an orthogonal projection on the guide plate 109 either upstream or downstream of the partition's orthogonal projection.

Under the effect of the drive unit 114 and of a guide ridge 111, a slice located upstream of the partition is immediately pushed up against the outlet tool 112 toward the outlet opening 110, whereas a slice located downstream of the partition is driven in rotation about the axis 115 over nearly three quarters of a turn of the drive unit 114 before being guided by a guide ridge 111 in the direction of the outlet tool 112. Accordingly, with this arrangement of the partition, no slice of the foodstuff can end up on the guide plate 109, partly on the guide ridges 111 and partly on the area of the guide plate located downstream, in relation to the direction of rotation of the cutter 104, of the outlet tool 112; in such a situation, the slice would be subjected by the drive unit 114 to at least two contradictory movements, the first in the direction of the outlet tool 112 and the second in rotation about the axis 115; the effect of this would be to completely break and tear the slice without producing any sticks.

In other embodiments, the apparatus 100 does not comprise a pusher rod to bring the foodstuff to be cut into the trajectory of the cutter 104. The supply conduit 107 rises from the trajectory of the cutter in a direction not parallel to the axis of rotation 115 and has surfaces that form an acute angle to the trajectory of the cutter 104. Preferably, the extremity of the supply conduit furthest from the cutter 104 has above it a hopper for receiving the foodstuff to be cut, with walls arranged in a chicane such that the user's hand cannot come into contact with the moving cutter 104. The foodstuff located in the hopper arrive by gravity into the opening of the supply conduit, then come into the trajectory of the cutter 104. With the combined effects of the cutter, gravity and the conduit surfaces forming the acute angle, the foodstuff is pushed into the trajectory of the cutter 104 by corner effect and are then cut into slices of regular thickness.

The drive motor 102 is a drive motor known to the person skilled in the art. The link between the drive motor 102 and the shaft 103, and the link between the shaft 103 and the cutter 104, for example using a wedge or a split pin, are known to the person skilled in the art. The cutter 104 is mounted on a support disc 116. At lower left on FIG. 1, this support disc 116 is represented twice to show both surfaces. The support disc 116 is substantially in the shape of a full disc comprising an opening 108, whose cutting edge 105 forms one of the edges. The opening 108 enables the foodstuff to pass through. During the rotation of the motor, the cutting edge 105 causes the cutting of the foodstuff, and the cut portion, in the form of a slice or strip, then falls into the plate 109 by gravity. The shape of the cutting edge 105 in a top view may be circular arcs or rectilinear.

Concerning the relative position of the cutter's support disc 104 in relation to the plate 109, the distance between each lower surface of the support disc and the plate 109, measured along the axis of rotation 115, must be as close as possible to the thickness of the slice or strip of the foodstuff, which is to be split by the outlet tool 112. In current devices, the plate rests on the housing, and the distance from the plate to the disc along the axis of rotation is set by the split pin connected to the drive shaft by means of a bayonet-type system, for example. As a result, said distance is determined by adding 15 different dimensions, in the worst case. The size tolerances inherent to mass production can lead to this distance varying by over 2.5 millimeters. If slices of foodstuff 6 millimeters thick are desired, such tolerances become unacceptable, and the device can no longer perform its function.

In the apparatus, the split pin 118 fixing the support disc 116 of the cutter 104 to the shaft 103 is kept for driving the cutter in rotation but, using a longitudinal slot 117 in the hub 122 of the support disc 116 means the split pin 118 does not determine the axial position of said support disc along the shaft 103. The support disc 116 is directly pressed up to the guide plate 109 in the center portion, i.e. close to the shaft 103, by means of opposite surfaces designed for friction, since the guide plate 109 is fixed and the support disc 116 rotates. Consequently, the split pin 118 now only has a drive function, rather than a drive and positioning function as per the prior art.

Figure 14:
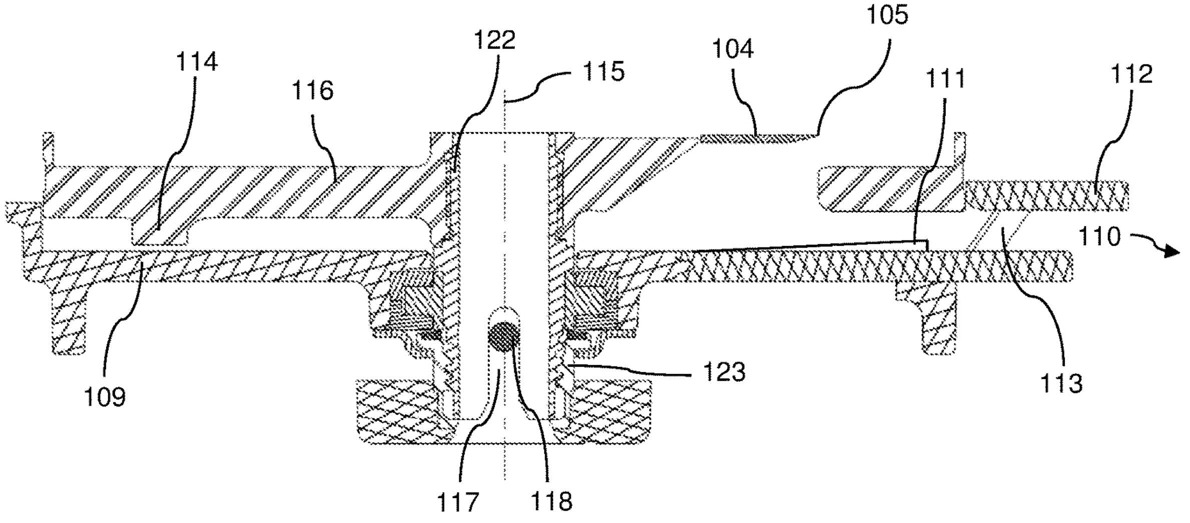
FIG. 14 represents, schematically and in cross section view, a support disc and a guide plate of a second embodiment of the apparatus that is the subject of the invention.

In some embodiments, such as that partially shown in FIG. 14, the cutter 105 is borne by a support disc 116, which comprises a hub 122 at its center, which hub is freely adjusted on the rotating shaft. A system for the shaft to drive the support disc 116 into rotation is made, for example, of a wedge between the shaft and the hub 122 of the support disc 116 or, as shown in FIG. 14, of a split pin 118 inserted transversally into the shaft opposite at least one slot 117 made longitudinally in the hub 122 of the support disc 116 for this purpose. Therefore, the support disc 116 is driven in rotation by the shaft and remains free of the shaft along the direction defined by the axis of rotation 115. This last degree of freedom in translation is blocked by a direct abutment of the support disc 116 onto an upper surface of the guide plate 109, preferably in a central area close to the hub 122 and utilizing opposite surfaces, whose shapes, sizes and kind are chosen by the person skilled in the art to reduce friction, or even to eliminate it through a rolling action.

To supplement these arrangements, the support disc 116 comprises a lock device 123 on its hub 122 under the guide plate 109, for example, as in FIG. 14, a screwed nut, which is also rests on a lower surface of the guide plate 109. As for the support disc 116 resting on the top of the guide plate 109, the lock 123 rests on the bottom, preferably in a central area close to the hub 122 and utilizing opposite surfaces, whose shapes, sizes and kind are chosen by the person skilled in the art to reduce friction, or even to eliminate it through a rolling action.

In this way, with all the arrangements of such embodiments, the position of the support disc 116 and therefore that of the cutter 104, its trajectory and the drive unit 114 for driving along the direction defined by the axis of rotation 115, is directly determined by the foodstuff guide plate 109. The disc is then linked to the plate 109 to be subjected to forces in both directions along the direction defined by the axis of rotation 115. The position in space of the disc, cutter, guide plate and drive unit assembly along the direction of the axis 115 is solely determined by the plate 109 resting on the housing 101.

As can be seen from reading the description in FIG. 14, the cutter 104 is preferably immobilized in translation by the guide plate 109 in the direction defined by the axis of rotation 115. In these conditions, the distance between the support disc 116 and the plate 109 now only depends on a small number of dimensions, or even only two dimensions, depending on the embodiments. It is then easy for mass production to keep this distance's variation to a low value, for example of the order of 0.2 to 0.3 mm, which is compatible with the function in all cases.

At the same time, these embodiments solve a second technical problem linked to driving the support disc 116 of the cutter 104 with a bayonet fitting; this appears to be a major problem because of the large inertia of the disc along its axis of rotation in embodiments of known devices. This is because, for a multi-purpose device designed to cut very different thicknesses of food, the support disc required to cut foodstuff slices of the order of six millimeters is thicker and therefore more massive, i.e. with stronger inertia, than a support disc for cutting thicker foodstuff slices.

In addition, by its very nature, the bayonet drive utilized in the prior state of the art creates a significant angular play between the split pin and the support disc. As a consequence of this play, at each start, the split pin hits the disc and reciprocally, at each stop, the disk hits the split pin on the opposite side because of its inertia. The energy utilized in these successive shocks is directly proportional to the inertia of the disc. Endurance testing has shown that this leads to the premature breakage of the split pin and that such a drive type is not suitable. The embodiments disclosed above avoid using such a type of bayonet, eliminate all the angular play and, consequently all shock effects.

Lastly, the embodiments described above, inasmuch as they define a guidance space of a height properly adjusted to the thickness of a slice of foodstuff between the plate 109 and the support disc of the cutter, make it impossible for several slices of foodstuff to overlap within this guidance space. With existing devices, this currently occurs when there is an adverse aggregation of all the dimensions that define this height, because of the tolerances for mass production. In this situation, very high forces are produced between the overlapping slices by corner effect. In this way, the embodiments described above reduce the stresses generated on the outlet tool 112 by the vertical forces and make it possible to simplify and lighten its construction.

The support disc 116 comprises at least one drive unit 114 subjected to the same rotation about the axis 115 as the cutter 104, following a trajectory located on the side of the trajectory of the cutter 104 opposite the inlet conduit 107, for driving the cut foodstuff between the guide plate 109 and the trajectory of the cutter 104 toward the outlet tool 112. The drive unit 114 is, in the embodiment shown in FIG. 14, angularly distant from the cutter 104 on the support disc 116. Inversely, in the embodiment shown in FIGS. 1 and 15, the drive unit 114 is angularly close to the cutter 104 on the support disc 116. The drive unit 114 is, for example, a protrusion known to the person skilled in the art on the side of the support disc opposite the conduit 107. For example, the protrusion forms a convex raised portion going through the support disc 116 along a radius of the support disc 116. The drive unit 114 pushes the cut foodstuff on the plate 109 up to the outlet tool 112.

Preferably, the distance between the support disc of the cutter 104 and the guide plate 109 is equal to or very slightly larger than the thickness of the slice of foodstuff.

The shape of the plate 109 is substantially that of a solid disc comprising a portion fitted with at least one guide ridge 111 up to the outlet tool 112. The guide ridge 111 may be a tab that is rounded off or with a raw edge. Preferably, the guide ridge 111 follows a straight line segment perpendicular to a radius of the plate 109 and parallel to at least one blade 113 of the outlet tool 112.

The outlet tool 112 comprises a set of blades 113 substantially on the periphery of the plate 109, over approximately one quarter of the periphery of the plate 109. The outlet tool 112 and the plate 109 of the appliance 100 may be combinations of the embodiments of outlet tools described with regard to FIGS. 2 to 11. The outlet opening 110 is an opening on one of the lateral surfaces of the housing 101. The housing 101 may be fitted with a flap around the outlet opening 115 to prevent the cut foodstuff from being spread out and localize the fall of the cut foodstuff.

Preferably, each element of the appliance 100 which the foodstuff can come into contact with is detachable for replacing or cleaning. In some embodiments, the outlet tool 112 is mechanically connected to the guide plate 109 in a removable manner to make it easy to change the outlet tool 112. The outlet tool 112 can be assembled onto the guide plate 109 by means of a tenon fitting into a slot of matching shape.

In some embodiments, the apparatus 100 comprises at least two outlet tools 112, the lateral spacing, i.e. in the plane perpendicular to the motor's axis of rotation, between the blades of one of the outlet tools 112 being different from the spacing between the blades of another outlet tool. These embodiments make it possible to adjust the cutting size of the foodstuff.

As can be seen from reading the above description of the elements, the foodstuff, potatoes for example, are placed in the supply conduit 107. The foodstuff come into contact with the cutter 104, either by gravity or by being pushed by the pusher rod. The cutting edge 105, which is driven in rotation by the motor 102 by means of the shaft 103, cuts the foodstuff into strips of substantially equal thickness. The strip, as it is being made, is guided by the cutter 104 in the direction of the opening 108 to be deposited by gravity onto the plate 109, which is fixed. By continuing its rotation movement, the cutter support disc comes to fully contain the strip in its thickness against the guide plate, then the strip is pushed by the drive unit 114, which is fixed under the support disc of the cutter 104 and therefore driven in rotation at the same speed and along the same trajectory as the cutter 104. The drive unit 114 pushes the strip onto the plate 109 toward the guide ridges 111, which guide the pushed strips toward the blades 113 of the outlet tool 112. The strip goes through the outlet tool 112 toward the outlet opening 110 by being cut into sticks, fries or shoestrings. For example, to obtain shoestrings having a square cross-section with six millimeters per side, the cutting edge 105 of the cutter 104 is spaced approximately six millimeters away from an upper surface of the support disc of the cutter 104 and the blades 113 are spaced approximately six millimeters away.

FIGS. 2 to 11 show ten arrangements of outlet tool blades. FIGS. 12 and 13 show two different embodiments of blades and guide ridges that are compatible with each other and with the arrangements of FIGS. 2 to 11.

In the remainder of the description, each blade is defined by one extremity called "upstream extremity" and an extremity called "downstream extremity" over the path followed by the foodstuff on the plate 109 toward the outlet opening 110. The upstream extremity is the extremity that comes into contact with the foodstuff to cut it. The upstream extremity comprises the cutting edge of the blade. The downstream extremity is the extremity closest to the outlet opening.

The embodiments of outlet tools 222 to 922 shown in FIGS. 2 to 9 comprise fourteen blades. These blades are on parallel planes spaced according to a preset cutting size, for example six millimeters. More generally, the number of blades of the outlet tool is defined by the preset cutting size and the size of the outlet tool 112. FIGS. 2 to 11 show, for each blade, a line perpendicular to this blade going thru the upstream extremity of this blade. These lines show that the orthogonal projection of one blade on the plane of each blade that is adjacent to it have no point on this adjacent blade. In other words, for any pair of adjacent blades, the portions of these two adjacent blades located on the trajectory of the cut foodstuff do not have any intersection of their orthogonal projections on a plane that is

- parallel to the axis of rotation and
- parallel to the segment formed by the intersection of one of these two blades with a plane perpendicular to the axis of rotation.

The embodiments of outlet tools 222 to 1022 shown in FIGS. 2 to 10 comprise guide ridges 221 to 1021 parallel to each other and parallel with the blades. The portion of the plate 209 to 1009 covered by the guide ridges represents approximately one quarter of the surface of the plate 209.

Figure 2:
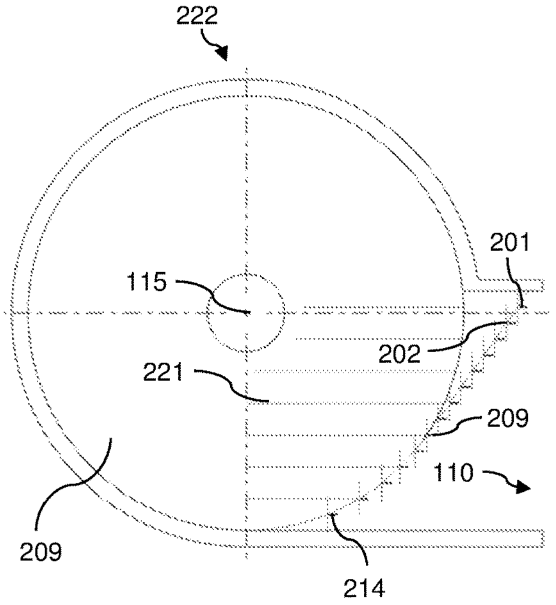
FIGS. 2 to 11 represent, schematically and in a top view, respectively the first to tenth particular embodiments of an outlet tool that is the subject of the invention.
Figure 3:
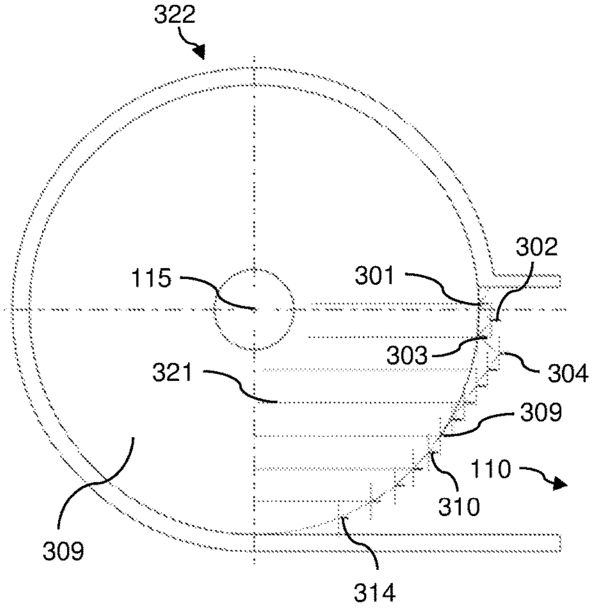
Figure 4:
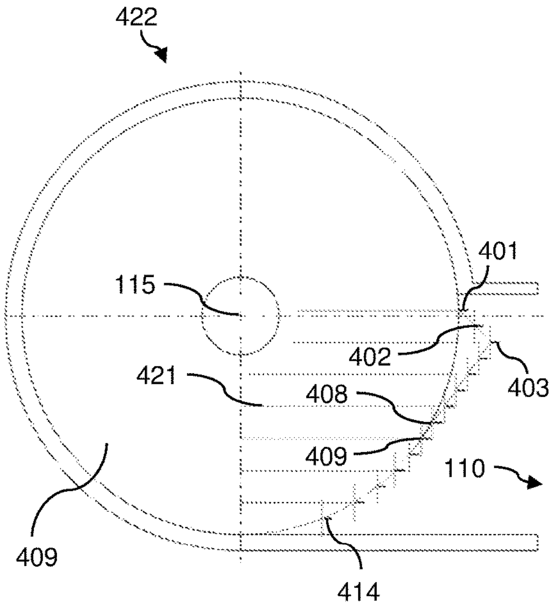
Figure 5:
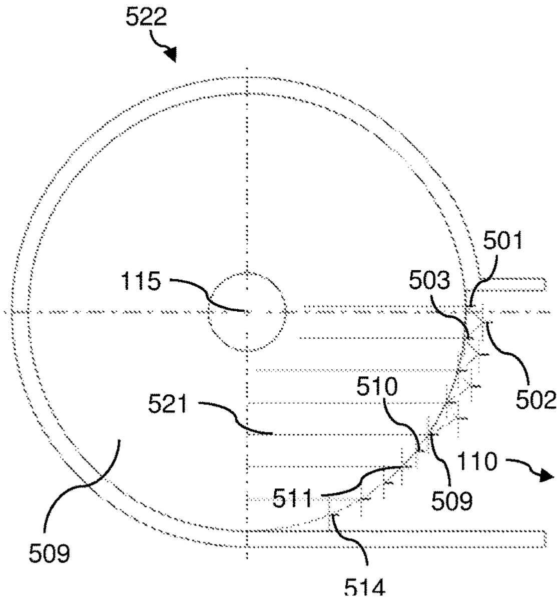
Figure 6:
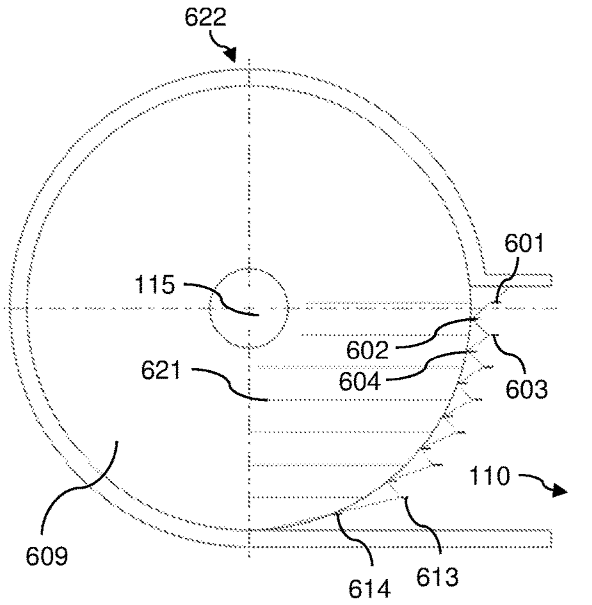
Figure 7:
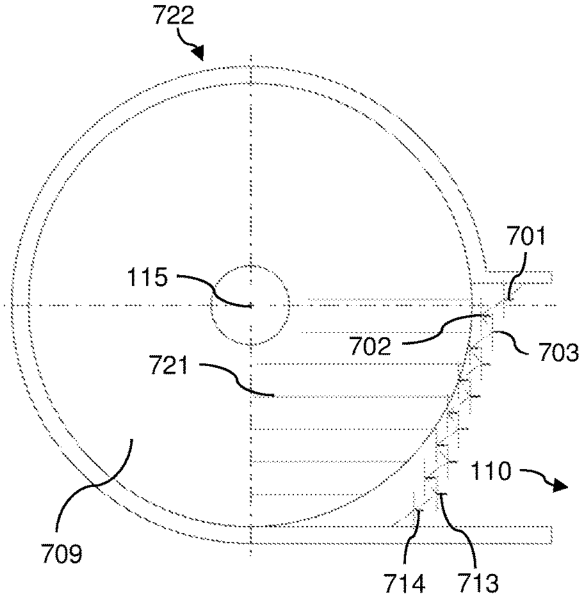
Figure 8:
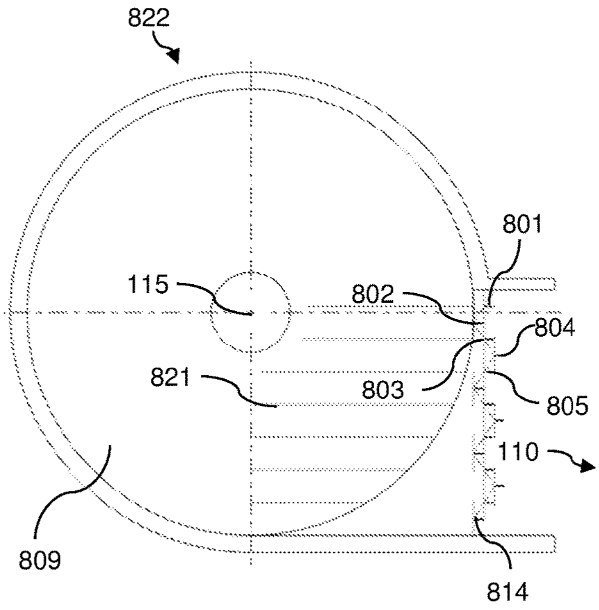
Figure 9:
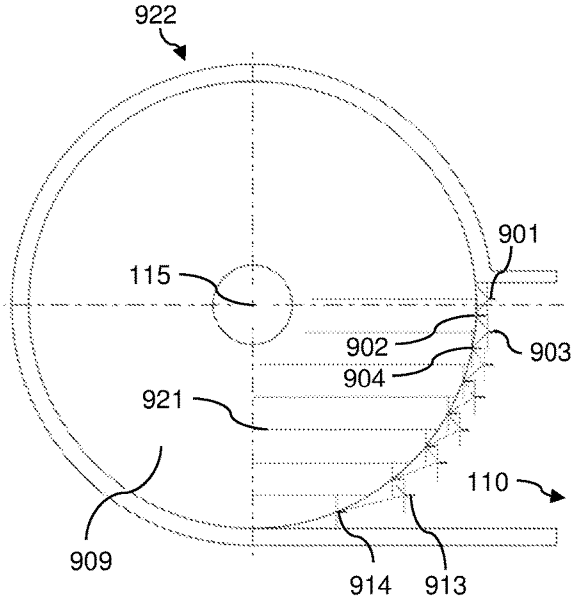

FIG. 2 shows a first arrangement of the blades 201 to 214 of an outlet tool 222. Blades 201 and 202 being parallel, the orthogonal projection of each other blade on the plane of a blade, 201 for example, is such that:

- the orthogonal projection has a downstream extremity of a blade 202 alternating with the upstream extremity of an adjacent blade 201, such that the orthogonal projections of the fourteen blades are aligned without superimposition; and
- each downstream extremity of a blade 202 has no intersection with the upstream extremity of another, directly adjacent, blade 201.

In a top view such as shown in FIG. 2, some of the upstream extremities of blades are placed on a circular arc matching the periphery of the disc forming the plate 209. Another part of the upstream extremities of blades are placed on a straight line tangential to the periphery of the disc forming the plate 209. This makes it possible to initiate the cutting of the foodstuff and to follow its passage through spaces between the other blades, without two adjacent blades being opposite each other and compressing the stick being made.

In the embodiment shown in FIG. 2, the upstream extremity of blades 209 to 214 are placed on a circular arc matching the periphery of the disc forming the plate 209 and the upstream extremity of blades 201 to 208 are placed on a straight line tangential to the periphery of the disc forming the plate 209.

To describe the first eight arrangements shown in FIGS. 2 to 9, one uses the following table, which associates, for each blade in the order of their number, two indicators "Am" [from the French "amont" for upstream] or "Av" [from the French "aval" for downstream] depending on whether this blade is upstream or downstream from the previous blade; and "C" if the cutting edge of the blade is on a circular arc matching the periphery of the disc forming the plate, or "T" if the cutting edge of the blade is, with the cutting edge of the previous or next blade, on a straight line tangential to the periphery of the disc forming the plate.

| | FIG. | | | | | | | | | |
|---|---|---|---|---|---|---|---|---|---|---|
| | 2 | 3 | 4 | 5 | 6 | 7 | 8 | 9 | 10 | 11 |
| Blade 1 | T | C | C | C | / | / | / | / | / | / |
| Blade 2 | AmT | Av | Av | Av | AmC | Am | AmC | AmC | AmT | AmT |
| Blade 3 | AmT | AmC | AvT | AmC | Av | Av | Av | Av | AmC | AmC |
| Blade 4 | AmT | AvT | AmT | Av | AmC | Am | Av | AmC | AmC | AmC |
| Blade 5 | AmT | AmT | AmT | AmC | Av | Av | Am | Av | AmC | AmC |
| Blade 6 | AmT | AmT | AmT | Av | AmC | AmC | Am | AmC | AmC | AmC |
| Blade 7 | AmT | AmT | AmT | AmC | Av | Av | Av | Av | AmC | AmC |
| Blade 8 | AmT | AmT | AmT | Av | AmC | Am | Av | AmC | AmC | AmC |
| Blade 9 | AmC | AmC | AmC | AmC | Av | Av | Am | Av | AmC | AmC |
| Blade 10 | AmC | AmC | AmC | AmC | AmC | Am | Am | AmC | / | AmC |
| Blade 11 | AmC | AmC | AmC | AmC | Av | Av | Av | Av | / | AmC |
| Blade 12 | AmC | AmC | AmC | AmC | AmC | Am | Av | AmC | / | / |
| Blade 13 | AmC | AmC | AmC | AmC | Av | Av | Am | Av | / | / |
| Blade 14 | AmC | AmC | AmC | AmC | AmC | Am | Am | AmC | / | / |

Figure 10:
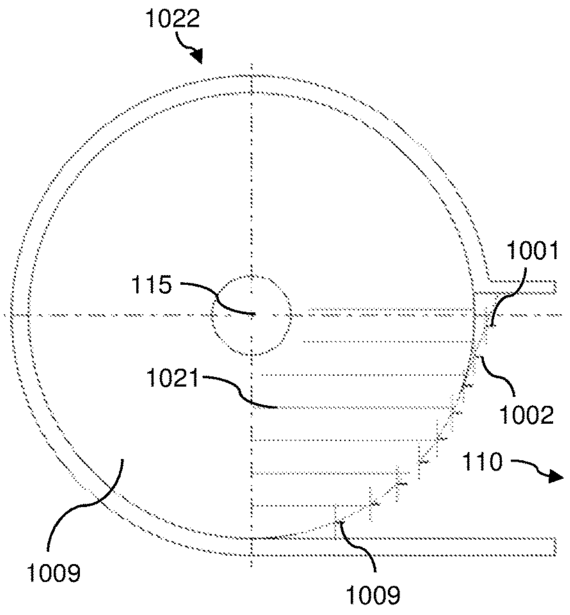

Compared to FIG. 2, the ninth arrangement shown in FIG. 10 has fewer blades, since the size of the outlet opening remains unchanged and the spacing between the blades changes by a greater value between blade 1001 and 1002 and a lower value between blades 1008 and 1009. The cross-sections at least some of the shoestrings, sticks or fries produced with the outlet tool 1022 are rectangles of different lengths.

FIG. 11 shows a tenth arrangement of the blades 1101 to 1111 of an outlet tool 1122. The outlet tool 1122 comprises eleven blades 1101 to 1111. These blades are spaced according to a preset cutting size, for example seven millimeters. More generally, the number of blades of the outlet tool 1122 is defined by the preset cutting size and the size of the outlet tool 1122.

The guide ridges 1121 are circular arcs, preferably concentric, whose center is different than the axis of rotation 115 of the cutter 104. Each cutter 1101 to 1111 is tangential to the circular arc defining a guide ridge 1121. The cutters 1101 to 1111 are not parallel to each other, but each one individually is tangential to the trajectory of the cut foodstuff defined by the guide ridges 1121. Thus, though they are not parallel, they do not constitute a hindrance to the passage of the foodstuff, and the operation of cutting the slice or strip into fries, shoestrings or sticks is achieved without difficulty. On the contrary, the angles between the planes of the blades cause the fries, shoestrings or sticks to spread apart while being made, making it easier to cut them. Preferably, the radius of the circular arc defining each guide ridge 1121 is greater than or equal to one and a half times the radius of the disc defining the plate 1109. The circular arcs of the guide ridges are concentric. This arrangement makes it possible to deviate the trajectory, initially circular, of the slice (imposed by the drive unit) by a segment which is closer to a portion of a spiral than to a segment of a straight line.

In a top view such as shown in FIG. 11, some of the upstream extremities of blades, 1103 to 1111, are placed on a circular arc matching the periphery of the disc forming the plate 1109. Another part of the upstream extremities of blades, 1101 to 1103, is placed on a straight line tangential to the periphery of the disc forming the plate 1109. This makes it possible to initiate the cutting of the foodstuff and to follow its passage through spaces between the other blades, without having two adjacent blades opposite each other, which would result in compressing the stick laterally while it is being made.

The portion of the plate 1109 covered by the guide ridges 1121 represents approximately one quarter of the surface of the plate 1109.

FIG. 12 shows a cross-section of an embodiment of an outlet tool 1222.

The outlet tool 1222 comprises at least one blade 1201. The blades 1201 have cutting edges whose mean slope forms an angle less than 70° to a plane perpendicular to the axis of rotation 115. This is because when the angle is greater than 70°, the blade penetrates less deeply into the foodstuff and the cutting ability is limited. In the embodiment shown in FIG. 12, the guide ridge is terminated by a shoulder at a preset distance from the blade 1201.

The outlet tool 1222 comprises at least one guide ridge 1221. At least one guide ridge on the plate 1209 has an increasing elevation in the direction of the trajectory of the foodstuff to be cut, above the upper surface of the guide plate.

Preferably the distance between the guide ridge and the disk bearing the cutter 104 is shorter than or equal to the desired thickness of the strip of foodstuff.

FIG. 13 shows a cross-section of an embodiment of an outlet tool 1322.

The outlet tool 1322 comprises blades 1301 having cutting edges made of a succession of concave arcs. The succession of concave arcs forms a succession of serrations, one at each intersection of concave arcs, substantially similar to that on a bread cutter. Obviously, the cutters 1301 are preferably inclined as shown in FIG. 12. In some embodiments, the blades 1301 have cutting edges whose mean slope forms an angle less than 70° to a plane perpendicular to the axis of rotation 115. The tool 1322 comprises at least one guide ridge 1321 on the plate 1309 having a cutting portion 1310 over at least its upstream portion in the direction of the trajectory of the foodstuff to be cut. The cutting portion makes it possible to pre-cut the foodstuff and to guide it toward the blades 1301. Preferably, the cutting portion represents a size less than ten percent of the desired size of the foodstuff to be cut. The outlet tool 112 shown in FIG. 1 may be any embodiment of the outlet tools shown in FIGS. 2 to 13.

The outlet tools shown in FIGS. 2 to 11 may have the particular features disclosed with reference to FIGS. 12 and 13 for the blades and the guide ridges according to any combination. Preferably, the cutters are made and sharpened individually and fastened to a mount. Preferably, in the embodiments described with reference to FIGS. 2 to 13, the thickness of the blades is less than or equal to 0.3 millimeters. Preferably, in the embodiments described with reference to FIGS. 2 to 13, the minimum distance between two adjacent blades, measured in a plane perpendicular to the axis of rotation and along a direction perpendicular to the trajectory of the foodstuff in the vicinity of these two blades, is smaller than or equal to eight millimeters. In some embodiments, the spacing between the cutters of the outlet tool is not constant. These arrangements make it possible to split a single slice of foodstuff into sticks with a rectangular cross section, to achieve a less regular cutting action similar to that achieved with a hand knife. In some embodiments, the cutting edges of the blades of the outlet tool are not all contained in a plane parallel to the axis of rotation. These arrangements make it possible to split a slice of foodstuff into sticks with trapeze-shaped cross-sections. In some embodiments, some cutting edges of the blades of the outlet tool are corrugated. These arrangements make it possible to split a slice of foodstuff into sticks whose faces cut by the blades of the tool have substantially the same corrugations as the edges of the blades.

The invention claimed is:

1. A motorized food-processor apparatus comprising:

a housing containing a drive motor for rotating a shaft about an axis of rotation;

at least one cutter configured for a rotational trajectory around the axis by the motor, said cutter comprising a cutting edge extending outward from the shaft to form a slice of foodstuff;

a cover connected to the housing and surrounding the rotational trajectory of the cutter, the cover being fitted with an inlet conduit for inserting foodstuff to be cut into said rotational trajectory;

an outlet opening for the slice;

a guide plate having a plurality of guide ridges for guiding the slice along a path to the outlet opening, each one of said guide ridges includes a cutting portion defined at a front edge of the guide ridge, such that foodstuff is precut before sliding between two adjacent guide ridges;

an outlet tool located on the path of the slice in the direction of the outlet opening;

at least one drive unit configured for rotation about the axis and being configured for driving the slice on the guide plate along said path toward the outlet tool;

wherein the outlet tool includes a plurality of blades disposed such that each pair of adjacent blades of said plurality of blades defines an outlet passage therebetween extending towards said outlet opening and in parallel to one of the guide ridges;

wherein each said outlet passage is defined such that a first blade of said pair of adjacent blades is located on a first side of said outlet passage and a second blade of said pair of adjacent blades is located on a second side of the outlet passage; and, wherein said first blade of said pair of adjacent blades extends along a first section of said outlet passage and said second blade of said pair of adjacent blades extends along a second section of said outlet passage, wherein said first section is non-overlapping with said second section.

2. The motorized food-processor apparatus according to claim 1, wherein the at least one cutter is immobilized in translation by the guide plate along the direction defined by the axis of rotation.

3. The motorized food-processor apparatus according to claim 1, wherein each of the blades of the plurality of blades has a cutting edge whose slope forms an angle less than 70° with a plane perpendicular to the axis of rotation.

4. The motorized food-processor apparatus according to claim 1, wherein each of the blades of the plurality of blades has a cutting edge made of a succession of concave arcs.

5. The motorized food-processor apparatus according to claim 1, wherein at least one of the guide ridges on the plate is inclining in the direction of the path of the slice to be cut, above the plane of the guide plate.

6. The motorized food-processor apparatus according to claim 1, wherein the thickness of each of the blades of the plurality of blades is smaller than or equal to 0.3 mm.

7. The motorized food-processor apparatus according to claim 1, wherein the minimum distance between said first and second blades of said pair of adjacent blades, measured in a plane perpendicular to the axis of rotation and along a direction perpendicular to the trajectory of the slice in the vicinity of these first and second blades, is smaller than or equal to 8 mm.

8. The motorized food-processor apparatus according to claim 1, wherein the distance between the cutter and the guide plate along a direction defined by the axis of rotation is smaller than or equal to 8 mm.

9. The motorized food-processor apparatus according to claim 1, wherein the outlet tool is connected mechanically to the guide plate in a removable manner.

10. A kit of outlet tools for a motorized food-processor apparatus according to claim 1, which comprises at least two outlet tools, the spacing between the blades of one of the outlet tools being different from the spacing between the blades of another outlet tool.

11. The motorized food-processor apparatus according to claim 1, wherein each one of said guide ridges is associated with one pair of adjacent blades and is positioned in front of one said first or second blades of said pair of adjacent blades.

12. The motorized food-processor apparatus according to claim 1, wherein each one of said guide ridges is associated with one pair of adjacent blades and is positioned in front of said first blade of said pair of adjacent blades, and wherein said first blade is closer to the outlet opening than said second blade.

13. The motorized food-processor apparatus according to claim 12, wherein the guide ridge extends past the second blade and up to the first blade of said pair of adjacent blades.

14. The motorized food-processor apparatus, according to claim 1, wherein each one of said guide ridges extends along one said outlet passages.

* * * * *